US009356853B2

(12) United States Patent
Mallya

(10) Patent No.: US 9,356,853 B2
(45) Date of Patent: May 31, 2016

(54) SYSTEMS AND METHODS OF MEASURING COMMUNICATION PERFORMANCE

(71) Applicant: AT&T INTELLECTUAL PROPERTY I, L.P., Atlanta, GA (US)

(72) Inventor: Arvind R. Mallya, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/446,643

(22) Filed: Jul. 30, 2014

(65) Prior Publication Data

US 2014/0341060 A1    Nov. 20, 2014

Related U.S. Application Data

(60) Division of application No. 13/684,989, filed on Nov. 26, 2012, now Pat. No. 8,824,510, which is a continuation of application No. 12/630,051, filed on Dec. 3, 2009, now Pat. No. 8,355,414, which is a division of application No. 11/708,416, filed on Feb. 20, 2007, now Pat. No. 7,649,849, and a continuation of application No. 10/319,216, filed on Dec. 13, 2002, now Pat. No. 7,221,685.

(51) Int. Cl.
*H04J 3/07* (2006.01)
*H04L 12/26* (2006.01)
*H04J 3/14* (2006.01)
*H04N 21/434* (2011.01)
*H04L 12/54* (2013.01)

(52) U.S. Cl.
CPC .............. *H04L 43/0882* (2013.01); *H04J 3/07* (2013.01); *H04J 3/14* (2013.01); *H04L 43/0894* (2013.01); *H04N 21/4341* (2013.01); *H04L 12/56* (2013.01)

(58) Field of Classification Search
CPC ... H04L 1/0007; H04L 47/36; H04L 29/0653; H04L 2012/5652; H04L 1/0028; H04L 1/0079; H04L 1/0083; H04L 1/0084; H04L 1/0085; H04J 3/076; H04J 3/07; H04J 3/073
USPC ......... 370/470, 471, 473, 476, 505, 509, 510, 370/535, 506
See application file for complete search history.

(56) References Cited

U.S. PATENT DOCUMENTS

| | | | |
|---|---|---|---|
| 5,267,236 A | | 11/1993 | Stephenson, Jr. |
| 5,331,670 A | * | 7/1994 | Sorbara et al. ................ 375/362 |
| 5,650,825 A | | 7/1997 | Naimpally et al. |
| 5,650,925 A | * | 7/1997 | Hesterman ................... 363/132 |
| 6,018,246 A | | 1/2000 | Dunsmore et al. |
| 6,148,337 A | | 11/2000 | Estberg et al. |
| 6,201,791 B1 | | 3/2001 | Bournas |
| 6,215,768 B1 | | 4/2001 | Kim |
| 6,219,358 B1 | | 4/2001 | Pinder et al. |
| 6,430,183 B1 | | 8/2002 | Satran et al. |
| 6,915,078 B1 | | 7/2005 | Mazzurco |
| 7,050,455 B2 | | 5/2006 | Nishihara |
| 7,054,269 B1 | | 5/2006 | Luguern et al. |

(Continued)

*Primary Examiner* — Brenda H Pham
(74) *Attorney, Agent, or Firm* — Toler Law Group, PC

(57) ABSTRACT

A device is disclosed including a memory configured to store a user data frame. The user data frame includes a first portion that includes traffic data. The user data frame also includes a second portion that includes a set of stuff bits arranged in a detectible pattern wherein a count of the set of stuff bits is associated with a measure of transport utilization of a data communication channel over which the user data frame is transported.

20 Claims, 3 Drawing Sheets

(56) References Cited

U.S. PATENT DOCUMENTS

| | | | |
|---|---|---|---|
| 7,221,685 B2 * | 5/2007 | Mallya | H04J 3/07 370/358 |
| 7,649,849 B2 | 1/2010 | Mallya | |
| 8,355,414 B2 * | 1/2013 | Mallya | H04J 3/07 370/506 |
| 8,824,510 B2 * | 9/2014 | Mallya | H04J 3/07 370/389 |
| 2002/0007418 A1 | 1/2002 | Hegde et al. | |
| 2002/0027929 A1 | 3/2002 | Eaves | |
| 2002/0129161 A1 | 9/2002 | Lloyd et al. | |
| 2005/0108420 A1 | 5/2005 | Brown et al. | |

* cited by examiner

SYSTEMS AND METHODS OF MEASURING COMMUNICATION PERFORMANCE

CROSS-REFERENCE TO RELATED APPLICATION(S)

This application claims priority from and is a divisional of U.S. patent application Ser. No. 13/684,989, filed on Nov. 26, 2012, and entitled "SYSTEMS AND METHODS OF MEASURING COMMUNICATION PERFORMANCE," which is a continuation of and claims priority from U.S. patent application Ser. No. 12/630,051, issued as U.S. Pat. No. 8,355,414, filed on Dec. 3, 2009, and entitled "SYSTEMS AND METHODS OF MEASURING DATA TRANSPORT UTILIZATION," which is a divisional of and claims priority from U.S. patent application Ser. No. 11/708,416, issued as U.S. Pat. No. 7,649,849, filed on Feb. 20, 2007, and entitled "SYSTEMS AND METHOD FOR MEASURING TRANSPORT UTILIZATION," which is a continuation of and claims priority from U.S. patent application Ser. No. 10/319,216, filed on Dec. 13, 2002, issued as U.S. Pat. No. 7,221,685 and entitled "METHOD AND SYSTEM RELATING TO BANDWIDTH UTILIZATION." Each of the above reference applications is hereby incorporated by reference.

FIELD OF THE DISCLOSURE

The present disclosure relates generally to bandwidth utilization measurement.

BACKGROUND

Management and operation of a large scale distributed communication network has a high degree of complexity. To address the complexity of managing such distributed communication networks, many computer tools and other automated methods have been developed. As part of the network management process, various network management and equipment usage reports have been developed and routinely produced. For certain optical network high speed data communication equipment, measurement of traffic utilization on specific transport facilities is desirable. Conventional methods to determine such traffic utilization have involved intrusive techniques such as inserting probes or nonuser test data into the communication network to sample the optical or electrical facility capacity usage. It would be desirable to provide a useful network traffic utilization report without the disadvantages involved with such intrusive techniques.

Accordingly, there is a need for an improved system and method for determining data transport utilization.

SUMMARY

The present disclosure is generally directed to a system and method of measuring transport utilization of data that is to be multiplexed and transmitted over a digital transport facility. In a particular embodiment, the system includes a traffic management reporting device to provide a report including performance information. The performance information is determined based at least in part on a count of stuff bits included in a user data frame having a fixed size payload.

In another embodiment, a user data frame is disclosed. The user data frame includes a traffic portion that is used to handle communication of user data and an unused portion including a set of stuff bits arranged in a detectible pattern. A count of the stuff bits is associated with a measure of transport utilization of a data communication channel over which the user data frame is transported.

In another embodiment, a communication system is disclosed. The communication system includes a data multiplexing device that includes a first input data channel and a multiplexed output. The first input data channel is associated with a first user data frame that has a fixed size data payload. The first user data frame includes a first traffic portion including first user data and a first unused portion that includes a first set of stuff bits. The communication system also includes an element manager coupled to the data multiplexing device. The element manager is configured to provide a measurement report that includes an indication of a utilization associated with the first input data channel. The indication is based at least in part on a count of the first set of stuff bits.

DETAILED DESCRIPTION

Figure 1:
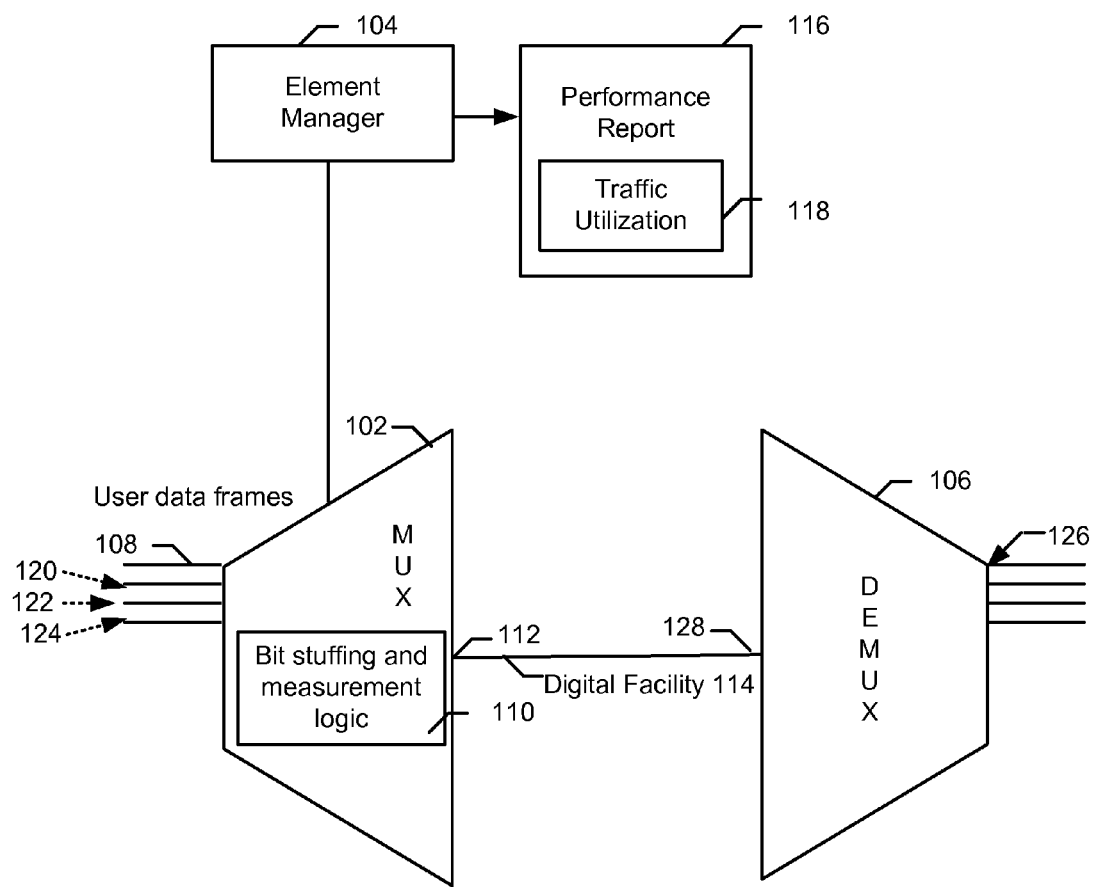
FIG. 1 is a block diagram that illustrates an embodiment of a system that includes a multiplexer with bit stuffing and measurement logic.

Referring to FIG. 1, a data communication system 100 is disclosed. The communication system 100 includes a data multiplexer 102, a digital facility 104, and a demultiplexer 106. The multiplexer 102 includes a plurality of input channels 108, 120, 122, and 124. The multiplexer 102 also includes digital bit-stuffing and measurement logic 110. The data multiplexer 102 has a multiplexer output 112 that is coupled to the digital communication transport facility 114. The communication system 100 also includes an element manager 104 that is coupled to the multiplexer 102. The element manager 104 provides an output performance report 116 that includes traffic utilization information 118. The element manager 104 may be implemented as a software module within a personal computer device. The performance report 116 may be a printed report or may be provided at a display device coupled to the element manger 104. The system 100 also includes a remote demultiplexer 106 coupled to a far end of the digital facility 114. The demultiplexer has a multiplexed input 128 and a plurality of demultiplexed output channels 126.

During operation, user data frames are received by the data multiplexer 102 from the input communication channels, such as a first input channel 108. The user data frames from the plurality of input channels are multiplexed to produce a multiplexed datastream at the multiplexer output 112. Where the input channels have unused data bandwidth, padding bits are stuffed into the available data frames so that the multiplexer output 112 has the appropriate fixed data payload size. The multiplexed output 112 carries a higher bandwidth, higher data speed communication signal than any of the individual input channels. The multiplexed data output signal is communicated over the digital facility 114 to the remote demuliplexer device 106. The demultiplexer 106 receives the multiplexed signal, demultiplexes the multiplex signal, to produce individual user data frames 126.

The element manager 104 receives communication measurement utilization information from the multiplexer 102.

This information is derived from and determined by the number of unused padding bits that are stuffed into each of the user data frames to create the fixed payload multiplexed output signal. The element manager 104 receives the bit-stuffing and measurement information and produces an integrated traffic performance report 116 that includes the measured traffic utilization information disclosed as traffic utilization element 118. The traffic utilization information is conveniently provided to a network operator and includes capacity availability of each of the individual communication channels carried by the digital facility 114. In this manner, a user of the network may advantageously determine data communication capacity without the inconvenience of dedicated probe tests or other intrusive testing methods. An example of the digital facility 114 that is supported includes facilities such as DS1, DS3, VT1.5, STS-1, STS-3, and OC-3 facilities.

With the disclosed system 100, traffic utilization is measured using real-time calculation of bandwidth based on time division multiplex (TDM) frame stuff-bit information determined during the framing and multiplexing stage.

The disclosed system 100 takes advantage of the scenario where the user does not issue sufficient traffic to fill the allocated data payload of a particular frame. In this scenario, the data frame is padded with stuff bits so that the payload bytes are comprised of both user traffic and/or the stuff bits. By counting the stuff bits and subtracting the number of stuff bits from the fixed payload, the amount of traffic information can be discerned for each data frame. The stuff bits are arranged in a detectible binary pattern to facilitate detection and counting within the measurement logic 110. By aggregating the traffic over time intervals, whether for a single frame or for many frames over several minutes, the traffic utilization may be measured and reported. By reporting the traffic utilization, for example for each provisioned electrical or optical facility, the multiplexer 102 delivers to a network operator a useful measurement report 116 regarding traffic utilization. The disclosed system 100 may be used to monitor TDM and SONET interoffice facility (IOF) loop bandwidth usage on a real-time basis, both on the IOF loop and customer drops.

The bandwidth usage data that is reported may be used to assist network planners, marketing and sales personnel to better understand bandwidth and network bottlenecks and usage patterns to improve planning for future capacity needs. In addition, reported traffic statistics may be used to improve the network owner's ability to market communication services to customers that may be better informed of capacity exhaustive conditions. Additional information regarding traffic usage can also be provided to customers as an enhanced service so that customers may make appropriate decisions regarding their own bandwidth capacity and usage patterns.

Figure 2:
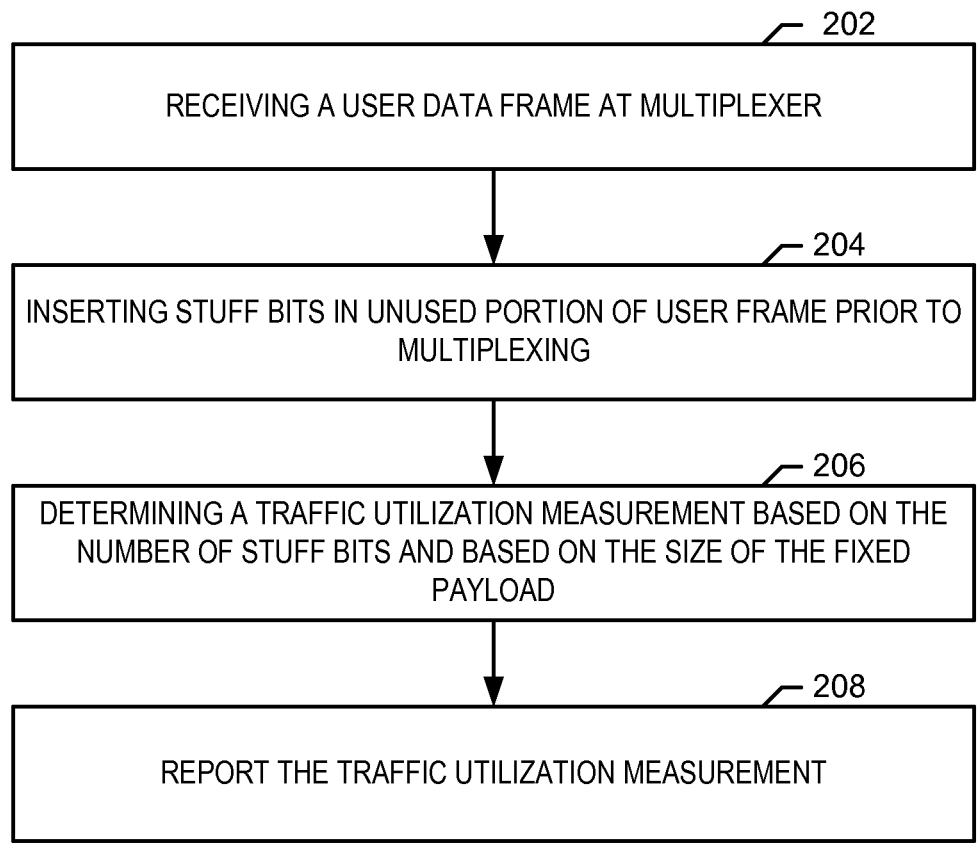
FIG. 2 is a flow chart that illustrates a method of determining traffic utilization of elements within a communication system.

Referring to FIG. 2, a method of measuring transport utilization of data to be multiplexed and transmitted over a digital transport facility is disclosed. The method includes a step of receiving a user data frame at the multiplexer, at 202. Padding stuff bits are then inserted into the unused portion of the user frame prior to multiplexing, at 204. A traffic utilization measurement is then determined based on the number of stuff bits and based on the size on the fixed payload, at 206. The traffic utilization measurement is then reported at 208.

Figure 3:
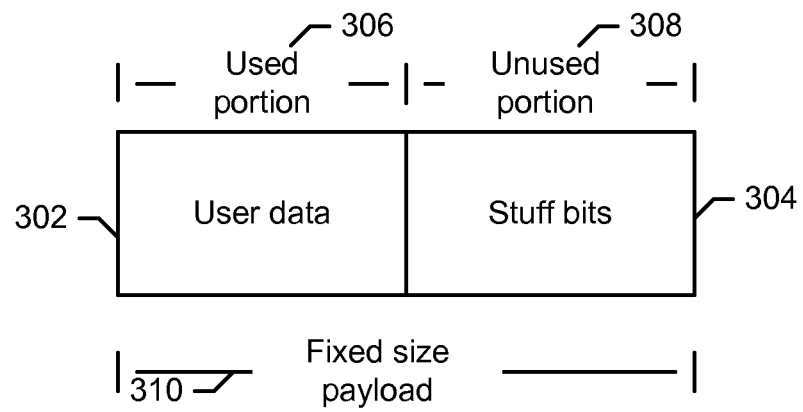
FIG. 3 is a general diagram that illustrates a portion of a data frame.

Referring to FIG. 3, a further detailed portion of a representative user frame, such as frame 108 is disclosed. The portion of the user frame includes a user data portion 302 and a stuff bit portion 304. The data frame 108 has a fixed size payload 310. In addition, for determining traffic measurement utilization, the user data frame has a used portion 306 and an unused portion 308. By comparing the number of stuff bits 304 in the unused portion 308 with respect to the size of the fixed payload 310, a determination may be made regarding utilization of the data frame. The portion of user data may be determined by subtracting the number of stuff bits 304 from the known fixed size of the payload 310.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device comprising:
   a processor; and
   a memory coupled to the processor, wherein the memory includes instructions that, when executed by the processor, cause the processor to perform operations including:
   storing a user data frame, wherein the user data frame comprises a first portion that includes traffic data;
   adding a set of stuff bits into a second portion of the user data frame to generate a modified user data frame having the set of stuff bits arranged in a detectible pattern, wherein a count of the set of stuff bits is associated with a measure of transport utilization of a data communication channel over which the user data frame is transported; and
   sending the count of the set of stuff bits to an element manager to determine the measure of transport utilization.

2. The device of claim 1, wherein the modified user data frame has a fixed size data payload.

3. The device of claim 1, further comprising a first output interface coupled to the element manager.

4. The device of claim 3, further comprising a second output interface coupled to a demultiplexer via a communication path.

5. The device of claim 1, wherein the operations further include:
   storing a second user data frame, wherein the second user data frame includes a third portion that includes second traffic data; and
   adding a second set of stuff bits into a fourth portion of the second user data frame to generate a second modified user data frame having the second set of stuff bits.

6. The device of claim 5, wherein the second set of stuff bits is arranged in the detectible pattern.

7. A computer-readable storage device storing instructions that, when executed by a processor, cause the processor to perform operations comprising:
   storing a user data frame in a memory, wherein the user data frame comprises a first portion that includes traffic data;
   adding a set of stuff bits into a second portion of the user data frame to generate a modified user data frame having the set of stuff bits arranged in a detectable pattern, wherein a count of the set of stuff bits is associated with a measure of transport utilization of a data communication channel used to communicate the modified user data frame; and
   sending the count of the set of stuff bits to an element manager to determine the measure of transport utilization.

8. The computer-readable storage device of claim 7, wherein the modified user data frame has a fixed size data payload.

9. The computer-readable storage device of claim 7, wherein the user data frame has a data payload size, and wherein the modified user data frame has the data payload size.

10. The computer-readable storage device of claim 7, wherein the count of the set of stuff-bits is inversely proportional to the measure of transport utilization.

11. The computer-readable storage device of claim 7, wherein the operations further comprise identifying the second portion of the user data frame.

12. The computer-readable storage device of claim 7, wherein the operations further comprise sending the modified user data frame to a device.

13. The computer-readable storage device of claim 12, wherein the device comprises a demultiplexer.

14. A method comprising:
   storing a user data frame to a memory, wherein the user data frame comprises a first portion that includes traffic data;
   adding a set of stuff bits into a second portion of the user data frame to generate a modified user data frame having the set of stuff bits arranged in a detectable pattern, wherein a count of the set of stuff bits is associated with a measure of transport utilization of a data communication channel used to communicate the modified user data frame; and
   sending the count of the set of stuff bits to an element manager to determine the measure of transport utilization.

15. The method of claim 14, wherein the modified user data frame has a fixed size data payload.

16. The method of claim 14, wherein the count of the set of stuff bits is inversely proportional to the measure of transport utilization.

17. The method of claim 14, further comprising identifying the second portion of the user data frame.

18. The method of claim 14, wherein the user data frame has a data payload size, and wherein the modified user data frame has the data payload size.

19. The method of claim 14, further comprising sending the modified user data frame to a device.

20. The method of claim 19, wherein the device comprises a demultiplexer.

* * * * *